United States Patent [19]
Jaeger

[11] 4,185,849
[45] Jan. 29, 1980

[54] RETRACTABLE STEP FOR MOTOR VEHICLE

[76] Inventor: Wilbert J. Jaeger, 1219 Opal Ave., Anaheim, Calif. 92805

[21] Appl. No.: 874,834

[22] Filed: Feb. 3, 1978

[51] Int. Cl.² ............................................. B60R 3/02
[52] U.S. Cl. ................... 280/166; 105/445; 182/88
[58] Field of Search ............... 280/166, 163; 105/445; 182/88

[56] References Cited
U.S. PATENT DOCUMENTS

| | | | |
|---|---|---|---|
| 1,198,357 | 9/1916 | Kirkley | 105/445 |
| 3,807,758 | 4/1974 | Rogge | 182/88 |
| 4,073,502 | 2/1978 | Frank | 280/166 |

*Primary Examiner*—John A. Pekar
*Attorney, Agent, or Firm*—Fulwider, Patton, Rieber, Lee & Utecht

[57] ABSTRACT

For use with a motor vehicle, a device is provided for moving a step between an extended and a retracted position which comprises a pneumatic cylinder including a piston attached to the step and resiliently biased to move the step to an extended position and arranged to move the step to a retracted position against the biasing means, in response to a sub-atmospheric pressure.

7 Claims, 4 Drawing Figures

U.S. Patent  Jan. 29, 1980  4,185,849
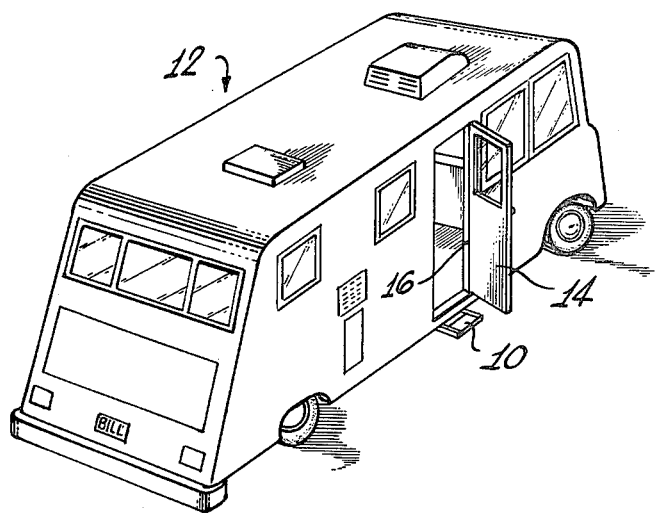
Fig.1
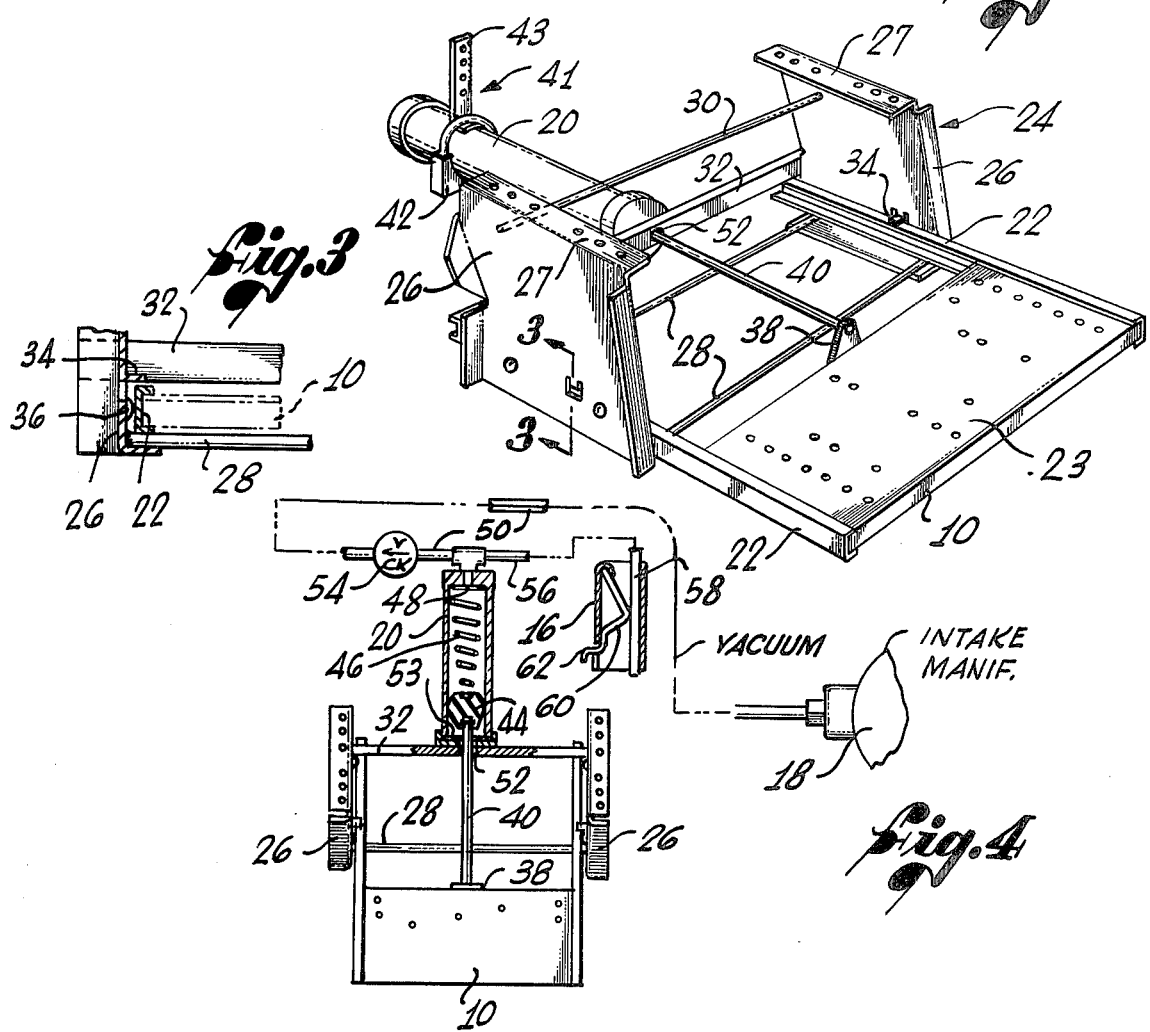
Fig.2
Fig.3
Fig.4

RETRACTABLE STEP FOR MOTOR VEHICLE

BACKGROUND OF THE INVENTION

This invention relates generally to steps for motor vehicles such as campers, trucks, and the like, and, more particularly, to automatically extendable and retractable steps for mounting and alighting from such vehicles.

On many motor vehicles a retractable step is provided beneath a door to assist a passenger or driver in mounting or alighting from the vehicle. Such a step is particularly useful on recreational vehicles, campers, trucks and the like, where the door of the vehicle is located at a height above the ground such that it is difficult or inconvenient for a person to step directly from the ground into the vehicle, or from the vehicle to the ground.

On such a vehicle, it is highly desirable for the step to be retractable so that it does not project from the wall of the motor vehicle when the vehicle is being driven, and it is particularly desirable for such a step to be automatically extendable and retractable. One way in which this has been accomplished is by providing a manually operable switch or valve in the vehicle for electrically or pneumatically retracting or extending the step. This arrangement is characterized by the disadvantage that people often forget to retract the step, and when the motor vehicle is operated with the step extended, severe damage is likely to be caused to either an object with which the step may come in contact or the step, or both.

Moreover, with an electrically operated step, a lockout device must be provided for permitting operation of the step only when the engine of the vehicle is running. If an electrically operated step is not provided with such a lockout device, frequent operation of the step, as for example where the switch is door operated, will cause undesirable discharge of the storage battery of the vehicle. If the step is extended and retracted pneumatically, as for example by the vacuum created in the intake manifold of the engine of the vehicle, the step can only be operated when the engine is running. In both of the above examples, the step will remain in the position it occupies when the engine is turned off.

Accordingly, there has existed a need for a safe, convenient and effective step for a motor vehicle which will automatically extend or retract to the desired position regardless of whether the engine of the vehicle is running and without requiring the manual operation of a switch or a valve. As will become apparent from the following, the present invention satisfies that need.

SUMMARY OF THE INVENTION

The present invention provides a door step for a motor vehicle which automatically extends whenever the door with which it is associated is open, and automatically retracts when the door is closed and the engine of the vehicle is turned on. When the door is closed and the engine of the vehicle is off, the step may be either extended or retracted as desired. Moreover, the construction of the step of the present invention is relatively inexpensive to manufacture, is trouble free and reliable in use, and is operable in response to the subatmospheric pressure in the intake manifold of the engine of the vehicle and the position of the door with which the step is associated without requiring the manual operation of any additional switch or valve.

More specifically, the retractable step of the present invention includes a pneumatic cylinder having a spring biased piston connected to the step for moving the step between and extended and retracted positions in response to the spring and the vacuum created in the intake manifold of the engine. For this purpose, the piston is urged toward a first end of the cylinder by a spring for moving the step to its extended position, and the piston is drawn toward a second end of the cylinder against the urging of the spring, by a vacuum created in the second end of the cylinder for moving the step to its retracted position. The first end of the cylinder is always in communication with atmospheric pressure, and the second end of the cylinder is connected through a passage to the intake manifold of the engine for creating the vacuum in the second end of the cylinder.

A check valve is disposed in the passage between the cylinder and the intake manifold for permitting air to be withdrawn from the second end of the cylinder when the engine is running, but when the engine is turned off and atmospheric pressure is restored to the intake manifold, the check valve prevents air from flowing back into the cylinder, thereby maintaining a vaccum in the cylinder and holding the step in its retracted position. A second valve, operated by the door with which the step is associated, opens the second end of the cylinder to communication with atmospheric pressure whenever the door is open, and closes that communication when the door is closed. Therefore, regardless of whether the engine is running, whenever the door is open, both ends of the cylinder are in communication with atmospheric pressure and the piston is urged by the spring to move the step to its extended position. When the door is closed and the engine is running, the step will be automatically retracted.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a perspective view of the retractable step of the present invention and illustrated as normally assembled upon a conventional recreational motor vehicle;

FIG. 2 is an enlarged perspective view of the retractable step of the present invention;

FIG. 3 is a further enlarged, fragmentary, partly sectional view taken substantially alone line 3—3 of FIG. 2; and FIG. 4 is a schematic diagram of the retractable step of the present invention, and shown associated with parts of a conventional motor vehicle.

DETAILED DESCRIPTION

As shown in the exemplary drawings, the present invention is embodied in an automatically operable step 10 for use with a motor vehicle, and herein is shown, for example, in FIG. 1 as mounted on a conventional recreational vehicle, indicated generally by reference numeral 12. In this instance, the step 10 is mounted below a door 14 on the side of the recreational vehicle 12, and a valve 16 is mounted adjacent the door and arranged to be closed by the door when the door is closed, and to be open when the door is open. The vehicle 12 includes an internal combustion engine (not shown) having an intake manifold 18, shown schematically in FIG. 4, within which a region of sub-atmospheric pressure is defined when the engine is running.

In accordance with the present invention, the step 10 includes a pneumatic cylinder 20 for automatically extending and retracting the step 10 in response to a combination of the position of the door 14 and the air pressure in the intake manifold 18. The present invention is arranged so that whenever the door 14 is open, the step 10 will be extended to facilitate mounting and alighting from the vehicle 12, and when the door is closed and the engine of the vehicle is running, the step will be retracted beneath the vehicle. Further, when the door 14 is closed and the engine of the vehicle 12 is not running, causing atmospheric pressure to be restored to the intake manifold 18, the step 10 may assume either the extended or retracted position as desired.

Toward the foregoing ends, the step 10 is supported by two elongated channel members 22 which project rearwardly from the sides of a horizontally disposed perforated plate 23 defining the step and are slideably received in a mounting frame indicated generally by reference numeral 24 in FIG. 2. The frame 24 herein includes a pair of generally rectangular shaped side members 26 laterally spaced and connected by two transverse bearing rods 28, an upper transverse rod 30, and a cylinder mounting brace 32. The side members 26 are each formed with an upper horizontal flange 27 by which the frame 24 can be secured to the undercarriage of the vehicle 12 with bolts (not shown).

As can best be seen in FIG. 3, the side members 26 are provided with a pair of inwardly extending ears 34 which overlie the channel members 22 for guiding the channel members which are slideably received above the transverse bearing rods 28 and below the brace 32. By this arrangement, when the step is extended, the channel members 22 bear downwardly against the bearing rods 28 and upwardly against the cylinder mounting brace 32 for supporting the weight of a person mounting or alighting from the vehicle 12. As can further be seen in FIGS. 2 and 3, the side frame members 26 are formed with side bearings 36 which project laterally inwardly from the side members 26 for laterally guiding the channel members 22 as the step 10 moves between its extended and retracted positions.

For effecting the movement of the step 10 between its extended and retracted positions, the pneumatic cylinder 20 is mounted to the brace 32 and connected to the step 10 by a connecting rod 40 attached to a flange 38 secured to the center of the rear edge of the perforated plate 23. To secure the rear portion of the cylinder 20 to the vehicle 12, a mounting bracket 41 is provided and herein comprises a clamp 42 secured around the cylinder and holding an upstanding perforated bracket 43 which can be bolted to the undercarriage of the vehicle 12.

As can best be seen in the schematic diagram of FIG. 4, the connecting rod 40 extends from a piston 44 disposed in the cylinder 20, and the piston 44 is biased by a spring 46 to urge the step 10 to its extended position. In the preferred embodiment of the invention, the piston 44 is molded of rubber or any other suitable flexible material, and the outer wall of the piston forms a partially spherical surface for maintaining sealing contact with the cylinder walls when the connecting rod 40 does not coincide with the axis of the cylinder. The spring 46 is preferably of the conical type so that the individual coils will collapse one within the other and occupy a minimum amount of longitudinal space within the cylinder when the step 10 is retracted.

The rearward end of the cylinder 20 communicates through an aperture 48 with a conduit 50 which is connected to the intake manifold 18, and the forward end of the cylinder 20 is in constant communication with atmospheric pressure through an aperture 52 which passes through the end of the cylinder and through the cylinder mounting brace 32.

The connecting rod 40 extends through the aperture 52, and the aperture 52 is sufficiently larger than the connecting rod 40 to allow the connecting rod to reciprocate freely therethrough, and to provide ample area around the connecting rod for venting the forward end of the cylinder chamber to atmosphere. For the purpose of preventing foreign materials such as dirt or dust from entering the cylinder 20 through the aperture 52, a filter 53 made of fabric or any suitable foraminous material can be provided adjacent the aperture 52.

In order to enable the sub-atmospheric pressure in the intake manifold 18 to evacuate air from the rearward portion of the cylinder 20 and maintain the vacuum in the cylinder 20 after atmospheric pressure has been restored in the intake manifold 18, a check valve 54 is disposed in the conduit 50. The check valve 54 may be of any conventional design and serves to permit the flow of air from the cylinder 20 to the intake manifold 18, and prevent the flow of air from the manifold 18 to the cylinder 20.

In order to insure that the step 10 will be automatically extended whenever the door 14 is open, the door operated valve 16 is arranged to place the rearward portion of the cylinder 20 in communication with atmospheric pressure when the door 14 is open, and close that communication when the door 14 is closed. Toward this end, the door operated valve 16 communicates with the aperture 48 through a conduit 56 which ends in a flexible tubing portion 58 within the valve 16. A valve actuating arm 60 is pivotally disposed in the valve 16 and ends in a projection 62 for contacting the door 14 when the door 14 is closed. The valve 16 is mounted in the vehicle 12 so that when the door 14 is closed, the door 14 bears against the projection 62 causing the arm 60 to pinch the flexible tubing 58 so that no air may pass therethrough, and when the door 14 is open, the door 14 no longer contacts the projection 62, and the tubing 58 returns to its normal configuration thereby placing the aperture 48 in communication with atmospheric pressure through the conduit 56 and the tubing 58.

In operation of the step 10, when the door 14 is closed thereby closing the valve 16, and the engine of the vehicle 12 is started, a sub-atmospheric pressure is created in the intake manifold 18, and air is withdrawn from the cylinder 20 through the check valve 54 and the conduit 50. The reduced pressure in the cylinder 20 causes the piston 44 to move toward the aperture 48 against the urging of the spring 46 thereby retracting the step 10. If the engine is started while the door 14 is open, air enters through the valve 16, passes through the conduit 56, the check valve 54 and the conduit 50 to the intake manifold 18, and the step 10 remains extended until the door 14 is closed thereby closing the valve 16 and retracting the step 10 as described above.

When the engine of the vehicle 12 is turned off and atmospheric pressure is restored to the intake manifold 18, the check valve 54 prevents air from flowing from the intake manifold 18 to the cylinder 20, and the step 10 remains retracted until the door 14 is opened whereupon air at atmospheric pressure is supplied to the cylinder 20 through the tubing 58, the conduit 56 and the aperture 48, and the step 10 is extended by the force of the spring 46. With the engine of the vehicle 12 turned off, once air at atmospheric pressure has been supplied to the cylinder 20 as by opening the door 14, the step 10 will remain extended even if the door 14 is subsequently closed. However, the step 10 can be manually retracted when the door 14 is closed because manually retracting the step 10 will cause the piston 44 acting in the cylinder 20 to force air through the check valve 54, and when the step 10 is released, the check valve 54 will not permit air to be restored to the cylinder 20, so the step 10 will remain retracted until the door 14 is opened.

From the foregoing, it will be appreciated that the present invention provides a device for automatically extending and retracting a step 10 to the desired position without requiring the operator to manually actuate an independent switch or valve for that purpose. Toward this end, the step 10 is arranged to be extended whenever the door 14 with which the step 10 is associated is open. When the door 14 is closed and the engine of the vehicle 12 is running, the step is automatically retracted, and when the door 14 is closed and the engine is turned off, the step 10 can be either extended or retracted as desired. Further, the step 10 may be fabricated conveniently and economically and is adaptable for use with substantially any conventional motor vehicle.

While a particular form of the invention has been illustrated and described, it will be apparent that various modifications can be made without departing from the spirit and scope of the invention.

I claim:

1. For use with a motor vehicle, a retractable step comprising:
    a substantially horizontal plate arranged to be reciprocally received in a retracted position within a rigid frame, and in an extended position in front of said rigid frame, and supported by a pair of elongated channel members extending into said frame when said plate is disposed in front of said frame;
    a pneumatic cylinder mounted on said frame and having a spring biased piston reciprocally disposed therein and operatively connected to said plate by a connecting rod for moving said plate between said retracted and extended positions, said spring biasing said piston to move said plate to said extended position when both sides of said piston are exposed to atmospheric pressure;
    a source of sub-atmospheric pressure comprising an intake manifold of an internal combustion engine in said motor vehicle;
    a passage communicating a region of said cylinder with a source of sub-atmospheric pressure said passage exposing said sub-atmospheric pressure to the side of the piston opposite the direction of the force of said spring, thereby causing said piston to move said plate, against the force of said spring, to said retracted position; and
    a valve means disposed in said passage for permitting air to flow from said region of said cylinder to said intake manifold and preventing flow from said intake manifold to said region of said cylinder.

2. A retractable step as defined in claim 1 further including means for selectively communicating said region of said cylinder with a supply of atmospheric pressure.

3. A retractable step as defined in claim 2 wherein said means for selectively communicating said region of said cylinder with said supply of atmospheric pressure includes a valve controlled by a door of said vehicle such that said region of said cylinder communicates with said supply of atmospheric pressure when said door is open, and said region of said cylinder does not communicate with said supply of atmospheric pressure when said door is closed.

4. For use with a motor vehicle, a retractable step comprising:
    a pneumatic cylinder;
    a piston disposed in said cylinder and operatively connected to said step for moving said step between an extended position and a retracted position;
    means biasing said piston to move said step toward said extended position;
    a source of sub-atmospheric pressure comprising an intake manifold of an internal combustion engine in said motor vehicle;
    a region of said cylinder communicating with a source of sub-atmospheric pressure through a passage connecting said region to said source, said sub-atmospheric pressure causing said piston to move toward said region, against the force of said biasing means, thereby moving the step to said retracted position; and
    valve means disposed in said passage for permitting air to flow from said region of said cylinder to said source of sub-atmospheric pressure, but not permitting flow from said source of sub-atmospheric pressure to said region of said cylinder.

5. A retractable step as defined in claim 4 further including means for selectively communicating said region of said cylinder with a supply of atmospheric pressure.

6. A retractable step as defined in claim 5 wherein said means for selectively communicating said region of said cylinder with said supply of atmospheric pressure includes a valve controlled by a door of said vehicle such that said region of said cylinder communicates with said supply of atmospheric pressure when said door is open, and said region of said cylinder does not communicate with said supply of atmospheric pressure when said door is closed.

7. For use with a motor vehicle, an automatically extendable and retractable step for mounting and alighting from said vehicle, said step comprising:
    a pair of generally rectangular, vertically disposed, laterally spaced side members each attached at its upper end to an undercarriage of said vehicle adjacent a door of said vehicle, and attached to each other at their lower ends by a plurality of transverse bearing rods, and further attached to each other at their rearward ends by a transverse cylinder mounting brace, said side members, bearing rods and brace forming a box-like frame;
    a substantially horizontal plate arranged to be reciprocally received in a retracted position within said frame, and in an extended position in front of said frame, said plate supported at its lateral sides by a pair of elongated channel members extending into said frame when said plate is disposed in front of said frame, and disposed above said transverse bearing rods and below said cylinder mounting brace;

a pneumatic cylinder mounted at one end on said brace substantially midway between said side members, and secured at its other end to said undercarriage of said vehicle, and having a spring biased piston reciprocally disposed therein and operatively connected to said plate by a connecting rod for moving said plate between said retracted and extended positions, said spring biasing said piston forwardly to move said plate to said extended position when both sides of said piston are exposed to atmospheric pressure;

a passage communicating a rearward region of said cylinder with an intake manifold of an internal combustion engine of said vehicle for exposing a rearward side of said piston to sub-atmospheric pressure when said engine is operating, thereby causing said piston to move said plate, against the force of said spring, to said retracted position;

a valve means disposed in said passage for permitting air to flow from said region of said cylinder to said intake manifold, and preventing flow of air from said intake manifold to said region of said cylinder; and a second valve means for selectively communicating said region of said cylinder with a supply of atmospheric pressure, said second valve means being controlled by said door of said vehicle such that said region of said cylinder communicates with said supply of atmospheric pressure when said door is open, and said region of said cylinder does not communicate with said supply of atmospheric pressure when said door is closed.

* * * * *